US012752485B2

(12) United States Patent
Burfeind

(10) Patent No.: US 12,752,485 B2
(45) Date of Patent: Oct. 6, 2026

(54) LIFTING APPARATUS FOR A SUPPORT DEVICE OF AN INSTALLATION FOR ADDITIVELY MANUFACTURING A THREE-DIMENSIONAL WORKPIECE

(71) Applicant: NIKON SLM SOLUTIONS AG, Luebeck (DE)

(72) Inventor: Kai Burfeind, Luebeck (DE)

(73) Assignee: NIKON SLM SOLUTIONS AG, Luebeck (DE)

( * ) Notice: Subject to any disclaimer, the term of this patent is extended or adjusted under 35 U.S.C. 154(b) by 109 days.

(21) Appl. No.: 18/862,305

(22) PCT Filed: Jun. 12, 2023

(86) PCT No.: PCT/EP2023/065580
§ 371 (c)(1),
(2) Date: Nov. 1, 2024

(87) PCT Pub. No.: WO2023/242079
PCT Pub. Date: Dec. 21, 2023

(65) Prior Publication Data

US 2025/0340016 A1 Nov. 6, 2025

(30) Foreign Application Priority Data

Jun. 15, 2022 (DE) ..................... 10 2022 115 097.6

(51) Int. Cl.
*B22F 12/90* (2021.01)
*B22F 12/00* (2021.01)
(Continued)

(52) U.S. Cl.
CPC .......... *B29C 64/232* (2017.08); *B22F 12/222* (2021.01); *B22F 12/30* (2021.01); *B29C 64/245* (2017.08); *B33Y 30/00* (2014.12)

(58) Field of Classification Search
CPC .......... B22F 10/28; B22F 10/30; B22F 10/85; B22F 12/222; B22F 12/30; B22F 12/90;
(Continued)

(56) References Cited

U.S. PATENT DOCUMENTS

| | | | |
|---|---|---|---|
| 6,554,600 | B1 | 4/2003 | Hofmann et al. |
| 10,919,226 | B2 | 2/2021 | Herzog et al. |
| 2012/0291701 | A1 | 11/2012 | Grasegger et al. |

FOREIGN PATENT DOCUMENTS

| | | |
|---|---|---|
| CN | 205437144 | 8/2016 |
| CN | 106623920 | 5/2017 |

(Continued)

OTHER PUBLICATIONS

European Patent Office, International Search Report and Written Opinion, International Patent Application No. PCT/EP2023/065580, Sep. 28, 2023.

(Continued)

*Primary Examiner* — Leo B Tentoni
(74) *Attorney, Agent, or Firm* — Williams Mullen; Thomas F. Bergert

(57) ABSTRACT

The invention relates to a lifting apparatus for a carrier device of a system for the additive manufacturing of a three-dimensional workpiece. The lifting apparatus comprises a base element, at least one first spindle attached to the base element, a lifting platform and at least one second spindle attached to the lifting platform. Further, the lifting apparatus comprises at least one intermediate frame comprising at least one first driving device for vertically moving the intermediate frame relative to the first spindle and the base element and at least one second driving device for vertically moving the second spindle and the lifting platform relative to the intermediate frame.

15 Claims, 6 Drawing Sheets

Figure 1:
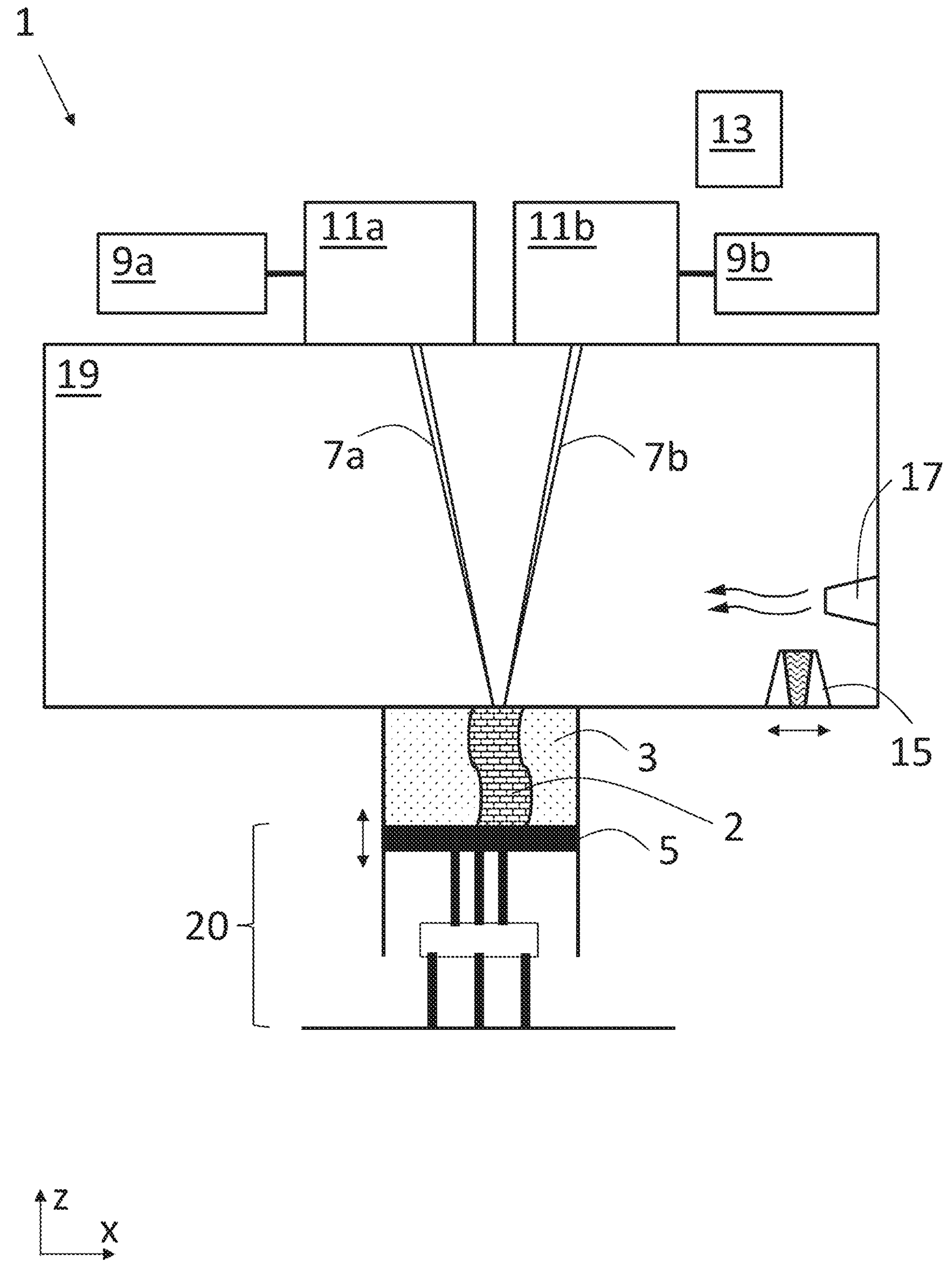

(51) Int. Cl.

| | |
|---|---|
| ***B22F 12/30*** | (2021.01) |
| ***B29C 64/232*** | (2017.01) |
| ***B29C 64/245*** | (2017.01) |
| ***B29C 64/393*** | (2017.01) |
| ***B33Y 30/00*** | (2015.01) |
| ***B33Y 50/02*** | (2015.01) |
| ***B66F 3/08*** | (2006.01) |

(58) Field of Classification Search

CPC ... B29C 64/153; B29C 64/232; B29C 64/245; B29C 64/393; B33Y 10/00; B33Y 30/00; B33Y 50/02; B66F 3/08; B66F 3/10; G05B 19/4099; G05B 2219/49018

USPC ............... 264/308, 497; 425/78, 135, 174.4; 254/98; 700/119

See application file for complete search history.

(56) References Cited

FOREIGN PATENT DOCUMENTS

| | | |
|---|---|---|
| CN | 107159890 | 9/2017 |
| CN | 206936376 | 1/2018 |
| CN | 107876767 | 4/2018 |
| CN | 108437460 | 8/2018 |
| CN | 207808493 | 9/2018 |
| CN | 208497679 | 2/2019 |
| CN | 112248435 | 1/2021 |
| DE | 102010006939 | 8/2011 |
| EP | 1037739 | 9/2000 |
| EP | 3159142 | 4/2017 |
| EP | 3275628 | 1/2018 |
| JP | 2016-002725 A | 1/2016 |
| JP | 2018-076585 A | 5/2018 |
| JP | 2019-022979 A | 2/2019 |
| WO | 200021736 | 4/2000 |
| WO | 2019077513 | 4/2019 |
| WO | 2020099381 | 5/2020 |
| WO | 2021061145 | 4/2021 |
| WO | 2021250560 | 12/2021 |

OTHER PUBLICATIONS

German Patent and Trademark Office, German Search Report, Patent Application No. DE 10 2022 115 097.6, Feb. 15, 2023.

Japan Patent Office, Office Action, Japanese Patent Application No. 2024-572645, Mar. 3, 2026.

LIFTING APPARATUS FOR A SUPPORT DEVICE OF AN INSTALLATION FOR ADDITIVELY MANUFACTURING A THREE-DIMENSIONAL WORKPIECE

CROSS-REFERENCE TO RELATED APPLICATIONS

This application is the U.S. national phase application of international patent application PCT/EP2023/065580 filed on Jun. 12, 2023 and claims the benefit of German patent application No. 10 2022 115 097.6 filed on Jun. 15, 2022, the entire disclosures of which are incorporated herein by way of reference.

The invention relates to a lifting apparatus for a carrier device of a system for the additive manufacturing of a three-dimensional workpiece. In particular and without limitation, the additive manufacturing may be a method of selective laser melting, selective laser sintering or selective electron beam melting.

In additive (or generative) methods for the production of three-dimensional workpieces and in particular in generative layering processes, it is known to apply an initially shapeless or shape-neutral molding compound of a raw material (for example a raw material powder) in layers to a carrier (also referred to herein as a carrier device) and to solidify it by site-specific irradiation (e.g. by melting or sintering) in order to ultimately obtain a workpiece of a desired shape. Irradiation may be carried out by means of electromagnetic radiation, for example in the form of laser radiation, or by means of particle radiation, for example in the form of electron radiation. In an initial state, the molding compound may initially be in the form of granules, in the form of powder or in the form of a liquid molding compound and be solidified selectively or, in other words, in a site-specific manner as a result of the irradiation. The molding compound may, for example, comprise ceramic, metal or plastic materials as well as mixtures of these materials. One variant of generative layering processes relates to so-called laser beam melting in a powder bed, in which in particular metallic and/or ceramic raw powder materials are solidified into three-dimensional workpieces by irradiation with a laser beam.

To produce individual workpiece layers, it is also known to apply raw material powder material in the form of a raw material powder layer to a carrier and to irradiate it selectively and in accordance with the geometry of the workpiece layer currently to be produced. The laser radiation penetrates the raw material powder material and solidifies it, for example as a result of heating, which causes melting or sintering. Once a workpiece layer has been solidified, a new layer of unprocessed raw powder material is applied onto the already produced workpiece layer. Known coater arrangements or powder application devices may be used for this. The now uppermost and still unprocessed raw material powder layer is then irradiated. Consequently, the workpiece is successively built up layer by layer, with each layer defining a cross-sectional area and/or a contour of the workpiece. In this context, it is also known to make use of CAD or comparable workpiece data in order to produce the workpieces essentially automatically.

It is to be understood that all of the above-described aspects as well as the following aspects may also be provided in the present invention.

Before a new layer of raw material is applied, the carrier device to which the first layer has been applied is usually lowered vertically downwards. This is done by a lifting apparatus, which for this purpose may have one or more motors, telescopic screw drives, actuators, pneumatic elements, etc., in order to move the carrier device vertically and then hold it at a predetermined height. The carrier device moves within a build cylinder, the side walls of which support the unsolidified raw material during the manufacturing process. The carrier device thus forms the bottom wall of the build cylinder.

The building size (in particular the building height) in additive manufacturing processes is growing continuously. The resulting increase in build cylinder height also increases the overall height of the additive manufacturing system. This leads to problems for end users if the ceiling heights of the production halls are low. There is therefore a need for solutions that reduce the system height.

One approach to solving this problem is the use of telescopic screw drives, for example. However, these require a relatively large amount of installation space, are relatively complex to manufacture and are therefore generally relatively expensive. Furthermore, the multi-stage nature of these telescopic screw drives under load in some situations shows a non-linear deformation curve and/or different stiffnesses of the respective screw stages.

It is thus desirable to provide a lifting apparatus which is compact, easy to manufacture and inexpensive. Furthermore, a relatively low deformability of individual elements of the lifting apparatus or at least a precise predictability of the deformation of the elements of the lifting apparatus is desirable.

It is therefore the object of the invention to provide a lifting apparatus which solves at least one of the problems described above or a related problem.

Accordingly, according to a first aspect, the invention relates to a lifting apparatus of a carrier device of a system for the additive manufacturing of a three-dimensional workpiece. The lifting apparatus comprises a base element, at least one first spindle attached to the base element, a lifting platform and at least one second spindle attached to the lifting platform. The lifting apparatus further comprises at least one intermediate frame comprising at least one first driving device for vertically moving the intermediate frame relative to the first spindle and the base element and at least one second driving device for vertically moving the second spindle and the lifting platform relative to the intermediate frame.

In particular, the system may be a system for selective laser melting or sintering, which comprises, for example, one or more of the features described above. Furthermore, the system may be a system for selective electron beam melting or another system for additive manufacturing which requires a vertically movable carrier device for the manufactured workpiece.

The base element may be a structural base, in particular a structural mounting base. The base element may comprise, for example, a plate and/or a grid structure. In particular, the base element may be configured to be placed on a floor or to be fixed to a floor and may thus enable a stationary attachment of the first spindle to a floor. If several first spindles are provided, the base element may enable a fixed relative positioning of the first spindles to each other. The base element may be a base plate. In particular, the base element may be a bottom plate of the system. The base element may, for example, stand directly on a floor of a production hall or stand on and/or be fastened to the floor with corresponding feet and/or damping elements. The base element may also be part of a production hall floor. The first spindle may, for example, be detachably attached to the base element, e.g. with screws, bolts, etc. Furthermore, the first spindle may also be firmly connected to the base element, for example welded on. The first spindle may extend vertically upwards from the base element. In other words, the base element may be in the form of an essentially plate-shaped base plate and define an x-y plane, with the first spindle extending perpendicularly thereto along the z direction.

The lifting platform may have any shape. The lifting platform may comprise a plate-shaped element and/or may be plate-shaped or at least substantially plate-shaped. In particular, the lifting platform may comprise a plate package. The lifting platform may either be configured to serve as a carrier device or comprise the carrier device, or it may be configured to serve as a further intermediate frame or comprise a further intermediate frame.

For the attachment of the second spindle to the lifting platform, the above-mentioned options for attaching the first spindle to the base element apply accordingly. The second spindle may extend perpendicular to a plane in which the lifting platform extends. For example, the lifting platform may be arranged parallel to the base element. The directions of extension of the first spindle and the second spindle may run parallel to each other and, in particular, perpendicular to the base element and the lifting platform.

The intermediate frame may have any shape. For example, the intermediate frame may comprise a plate to which the first and the second driving device are attached. However, the intermediate frame may also comprise no such (common) plate, but rather a first plate to which the first driving device (and optionally further first driving devices) is attached and a second plate to which the second driving device (and optionally further second driving devices) is attached. Furthermore, the intermediate frame may not comprise any plate(s) at all, but rather be composed of a linkage, with the driving devices being attached to rods of the linkage.

The first driving device and the second driving device may each comprise a ball screw drive, in particular with a shaft drive. The first and the second driving device may be designed in such a way that they each comprise a drive (in particular a ball screw drive), which, with appropriate control and power supply, rotates around the spindle, wherein the spindle itself is stationary and does not rotate. In this way, a vertical movement of the first driving device is performed relative to the first spindle. Furthermore, a vertical movement of the second spindle relative to the second driving device is performed in this way.

The lifting platform may comprise the carrier device of the system.

For example, the lifting platform may comprise and/or represent the carrier device in the form of a carrier plate. For example, the lifting platform may comprise a plate package, with an uppermost plate of the plate package representing the carrier device. The plate package may, for example, be attached to a plate-shaped element of the lifting platform by means of screws. In particular, raw material may be applied to the carrier plate. The fact that the lifting platform comprises the carrier device may mean that the carrier device is rigidly connected to the further elements of the lifting platform and/or forms a one-piece component together with the further elements of the lifting platform. In this case, it can be said that the lifting apparatus is two-stage, as it comprises two moving planes, namely the plane of the intermediate frame and the plane of the lifting platform. In other embodiments (see below), at least one further, additional stage (in particular above the second stage) may be provided.

The lifting platform may comprise a further intermediate frame, wherein the lifting apparatus further comprises a further lifting platform and at least one third spindle attached to the further lifting platform. The further intermediate frame may comprise at least one third driving device for vertically moving the third spindle and the further lifting platform relative to the further intermediate frame.

The lifting apparatus may thus be three-stage or have further stages, so that it may be four-stage, five-stage, etc. With regard to the attachment of the third spindle to the further lifting platform and with regard to the driving device, the above described with respect to the second spindles and to the second driving devices, respectively, may apply. The further lifting platform may comprise the carrier device of the system.

The first driving device and the second driving device may be controllable independently of one another.

In particular, the first and the second driving device may each comprise their own motor (e.g. servo motor) and/or actuator. Furthermore, the first and the second driving device may be controllable controllable independently of one another, for example via a corresponding gearbox. For example, a common motor may be provided and a gearbox coupled to the motor and the first and the second driving device, which in a first gearbox position drives only the first driving device and in a second gearbox position drives only the second driving device. Furthermore, a third gearbox position may be provided in which the first and the second driving device are driven simultaneously.

The first driving device may comprise a first motor and the second driving device may comprise a second motor.

Thus, the first driving device and the second driving device may be controlled separately from one another by a control device of the lifting apparatus. The separate control comprises, for example, controlling one of the first and the second driving device while the other driving device remains at a standstill, controlling the first and second the driving device in opposite directions and/or controlling the first and the second driving device at different speeds.

The lifting apparatus may further comprise at least one further first spindle attached to the base element. The intermediate frame may comprise at least one further first driving device for vertically moving the intermediate frame relative to the further first spindle and the base element.

With regard to the further first spindle and the further first driving device, the above-mentioned aspects and details discussed with regard to the first spindle and the first driving device may apply. In particular, two, three or four first spindles and—associated with these—two, three or four first driving devices may be provided.

The first driving device and the further first driving device may be controllable controllable independently of one another.

In this way, the intermediate frame can, for example, be inclined and/or horizontally oriented (hereinafter also: leveled) (in particular with respect to the ground horizon). At the same time, the carrier device can be tilted and/or leveled.

The lifting apparatus may also comprise a control unit for independently controlling the first driving device and the second driving device.

The control unit may, for example, be a control unit of the system or be comprised by it. The control unit may comprise a microprocessor and a (volatile or non-volatile) memory, wherein a control program is stored in the memory, which causes the respective driving devices to be controlled.

The lifting apparatus may further comprise at least one further second spindle attached to the lifting platform. The intermediate frame may comprise at least one further second driving device for vertically moving the further second spindle and the lifting platform relative to the intermediate frame.

With regard to the further second spindle and the further second driving device, the above-mentioned aspects and details discussed with regard to the second spindle and the second driving device may apply. In particular, two, three or four second spindles and—associated with these—two, three or four second driving devices may be provided.

The second driving device and the further second driving device may be controllable independently of one another.

In this way, the lifting platform can be tilted and/or leveled, for example, in particular with respect to a reference plane, such as the ground horizon, the coater, the laser optics or the process chamber floor. At the same time, the carrier device can be tilted and/or leveled.

The lifting apparatus may comprise at least three second spindles attached to the lifting platform, wherein the intermediate frame comprises at least three second driving devices for vertically moving the three second spindles and the lifting platform relative to the intermediate frame. Furthermore, the lifting apparatus may comprise a device for detecting an orientation of the lifting platform. The control unit may be configured to control the second driving devices based on detection data of the device for detecting the orientation of the lifting platform so that the lifting platform is horizontally oriented.

By providing at least three second spindles, the lifting platform may be horizontally oriented (leveled), in particular with respect to a reference plane, such as the ground horizon, the coater, the laser optics or the process chamber floor. Here, the lifting platform may be inclined about at least two non-parallel axes, which can enable complete leveling. The device for detecting the orientation may comprise, for example, a spirit level, an electronic spirit level, several triangulation lasers and/or corresponding sensors, for example for detecting the earth's gravitational force (comprising, for example, suitable MEMS). If the sensors detect, for example, that the lifting platform is not horizontally oriented, corresponding second driving devices may be controlled which bring the lifting platform into a horizontal orientation (i.e. level it).

The device for detecting an orientation of the lifting platform may comprise at least one linear encoder.

The linear encoder may, for example, enable high-precision (e.g. sub-micrometer accurate) positioning of the lifting platform in relation to one or more guide rails. The linear encoder may be a so-called glass scale linear encoder.

The lifting apparatus may further comprise at least one guide rail attached to the base element and at least one rail guide attached to the intermediate frame, for guiding the intermediate frame during its vertical movement relative to the first spindle and the base element.

The guide rail in combination with the rail guide can prevent tilting or twisting of the intermediate frame and/or tilting or twisting of the lifting platform so that these two elements always remain horizontally aligned. This applies in particular in the case where only a first spindle and/or a second spindle is provided. The rail guide may comprise one or more carriages, for example. In particular, at least two rail guides may be provided for the one or more guide rails.

The base element may comprise a base plate. In particular, the base element may be a base plate.

According to a second aspect, the invention relates to a system for the additive manufacturing of a three-dimensional workpiece which comprises the lifting apparatus of the first aspect.

All of the sub-aspects and details of the lifting apparatus discussed above can be provided accordingly in the lifting apparatus of the system. The additive manufacturing system may, for example, be a system for selective laser sintering, for selective laser melting or for selective electron beam melting. In addition to the lifting apparatus, the system may have one or more of the above described features of a corresponding known system.

The system for the additive manufacturing of a three-dimensional workpiece comprises, for example, a carrier device for applying the powder in several layers such that a powder bed is formed. Furthermore, one or more powder application devices may be provided for applying the powder and, if necessary, for applying powder of different materials. A separate powder application device may be provided for each material. The carrier device may be moved vertically downwards by means of the lifting apparatus so that the uppermost powder layer always remains at the same height in relation to a build chamber of the system. Furthermore, the system may comprise one or more irradiation units. The irradiation units each comprise a beam source (in particular a laser beam source) and an optical system with one or more optical components for shaping and deflecting the beam (e.g. beam expander, focusing unit, scanner device, F-theta lens).

Figure 2:
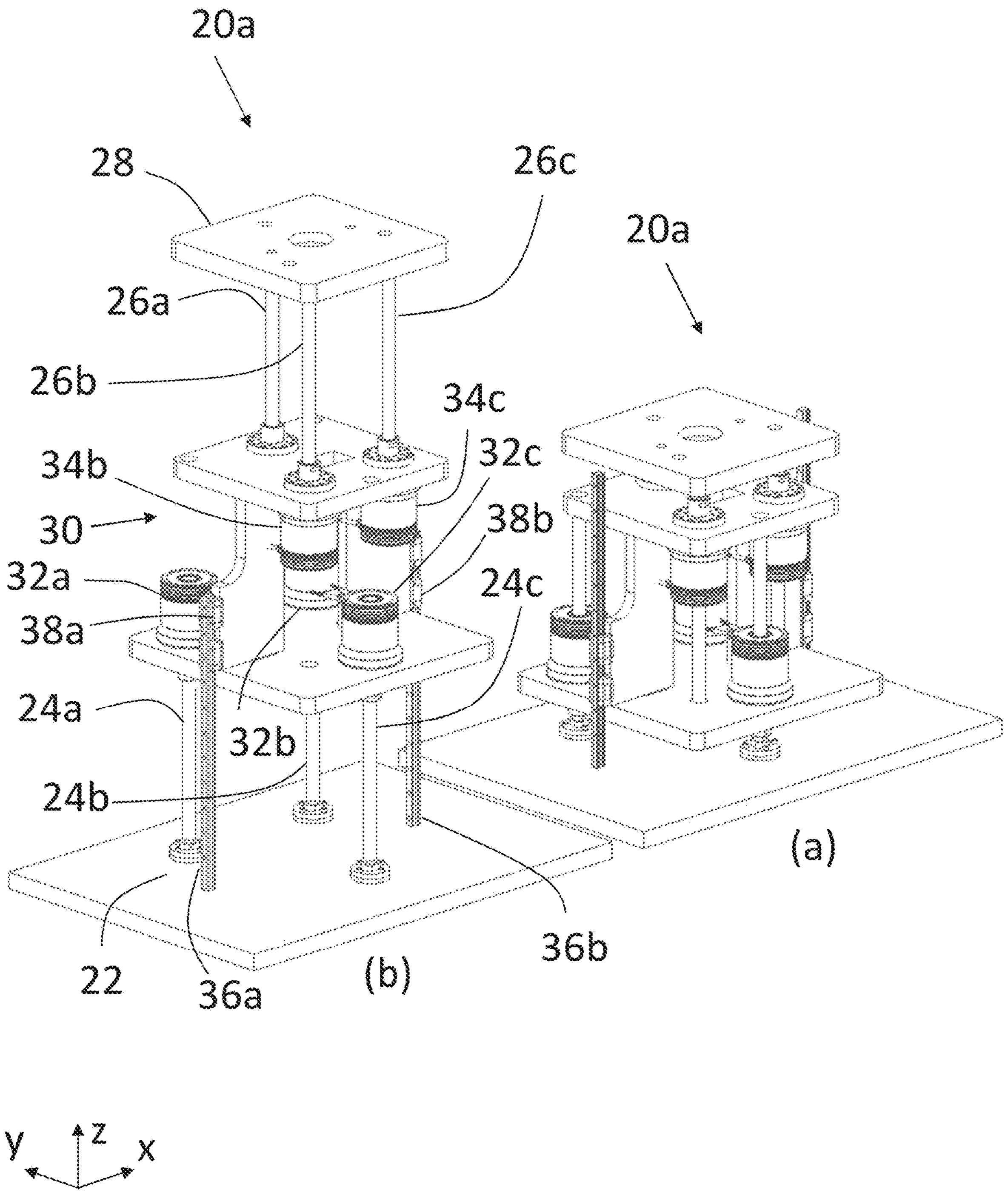
Figure 3:
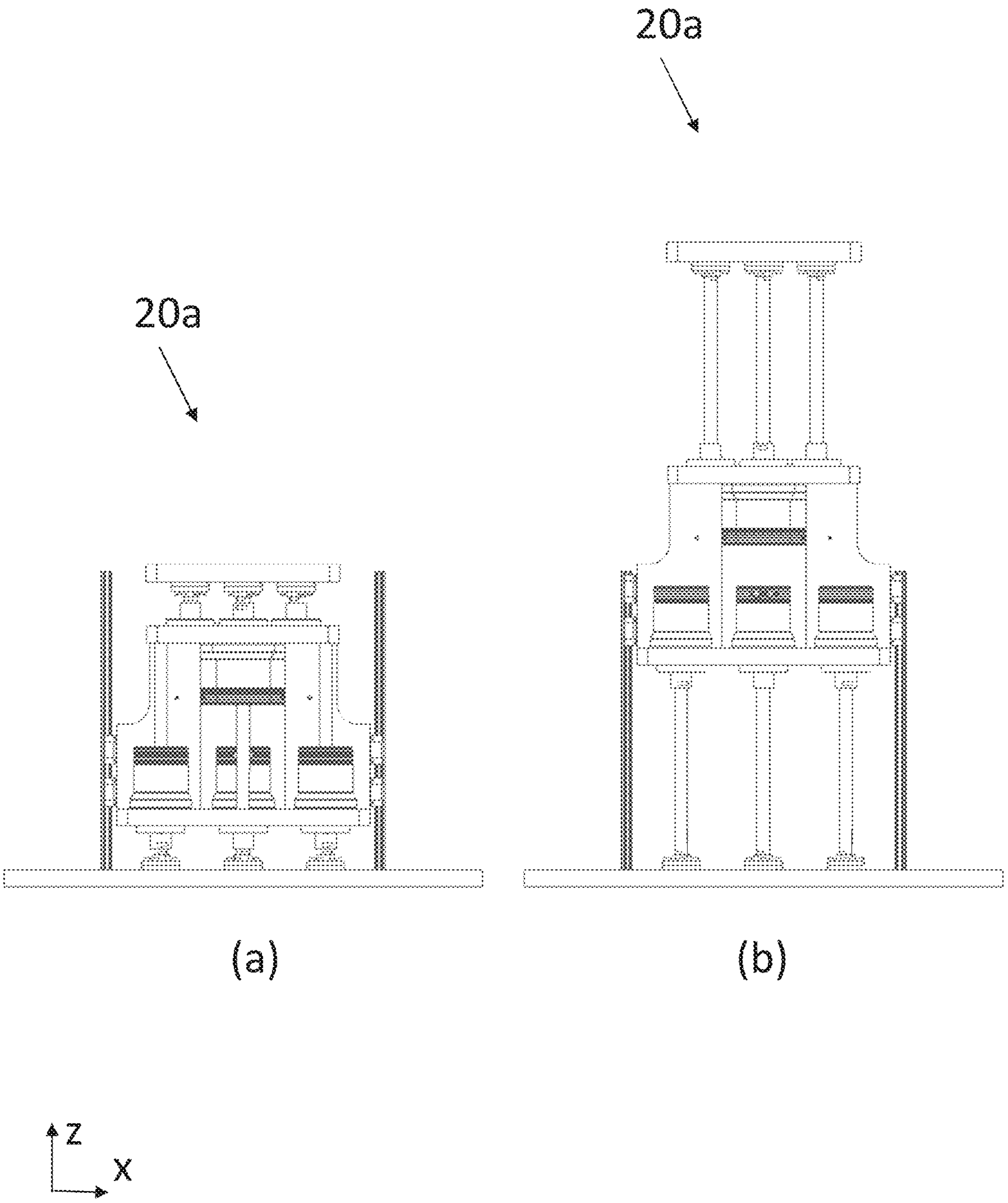
Figure 4:
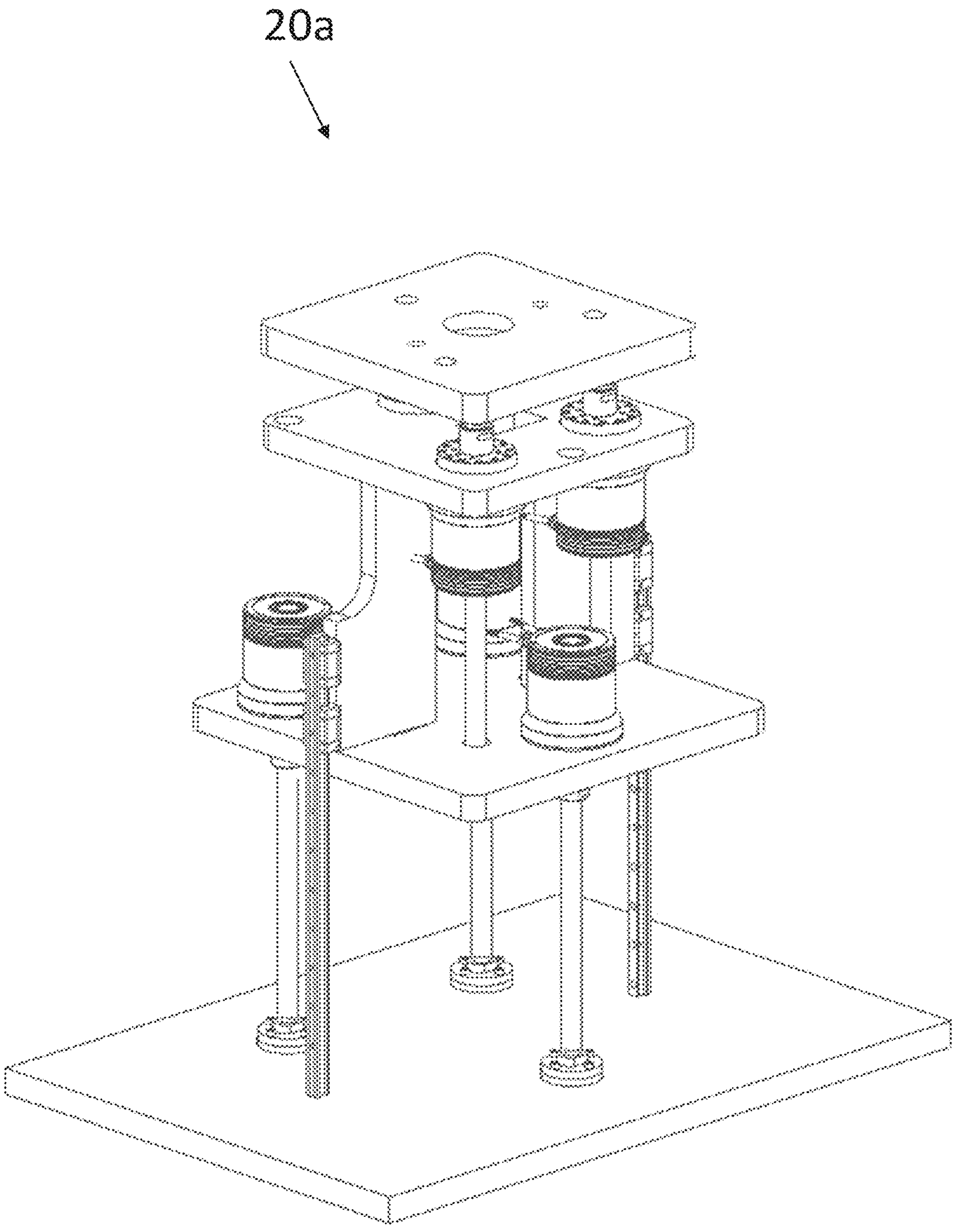
Figure 5:
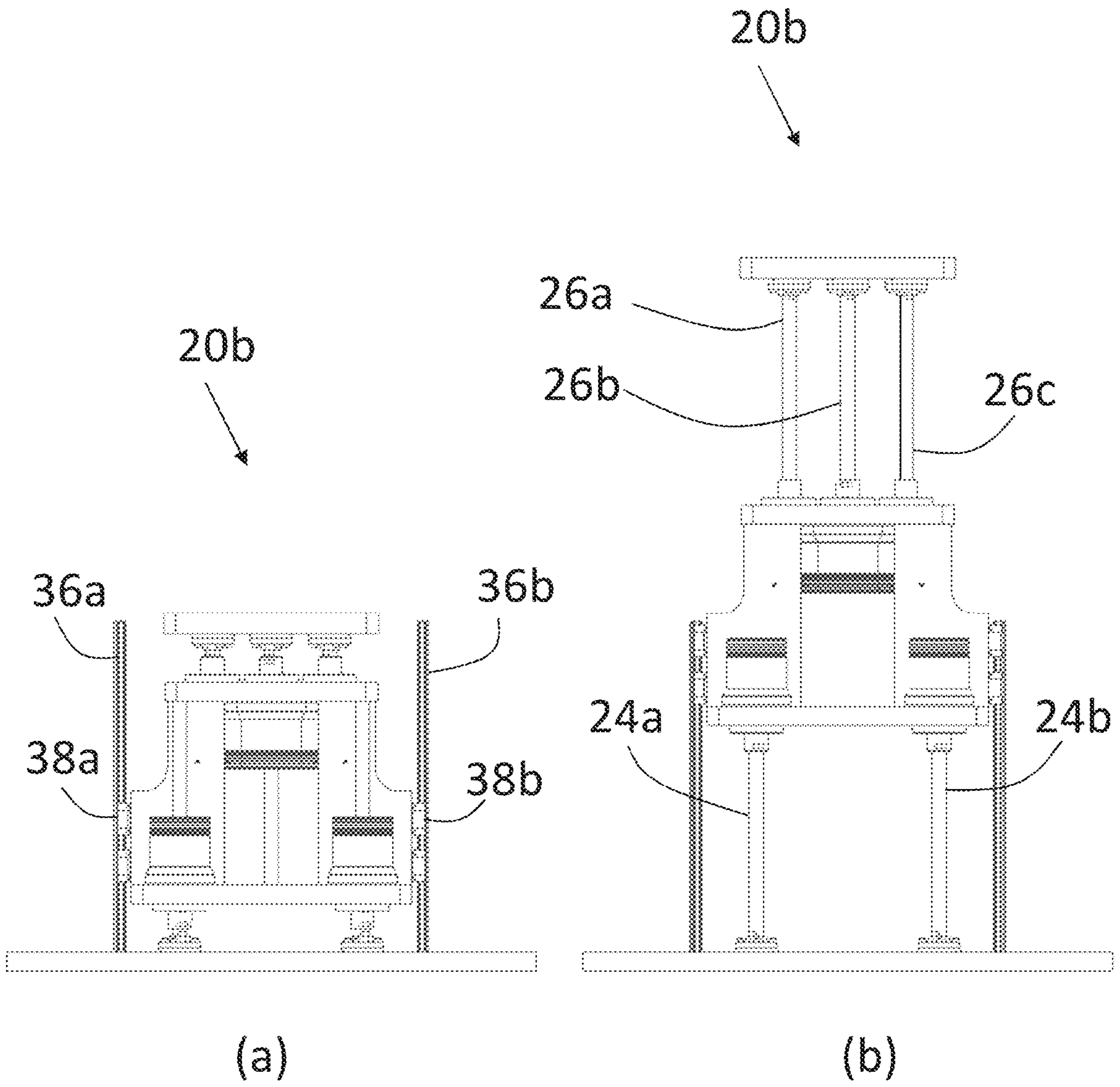
Figure 6:
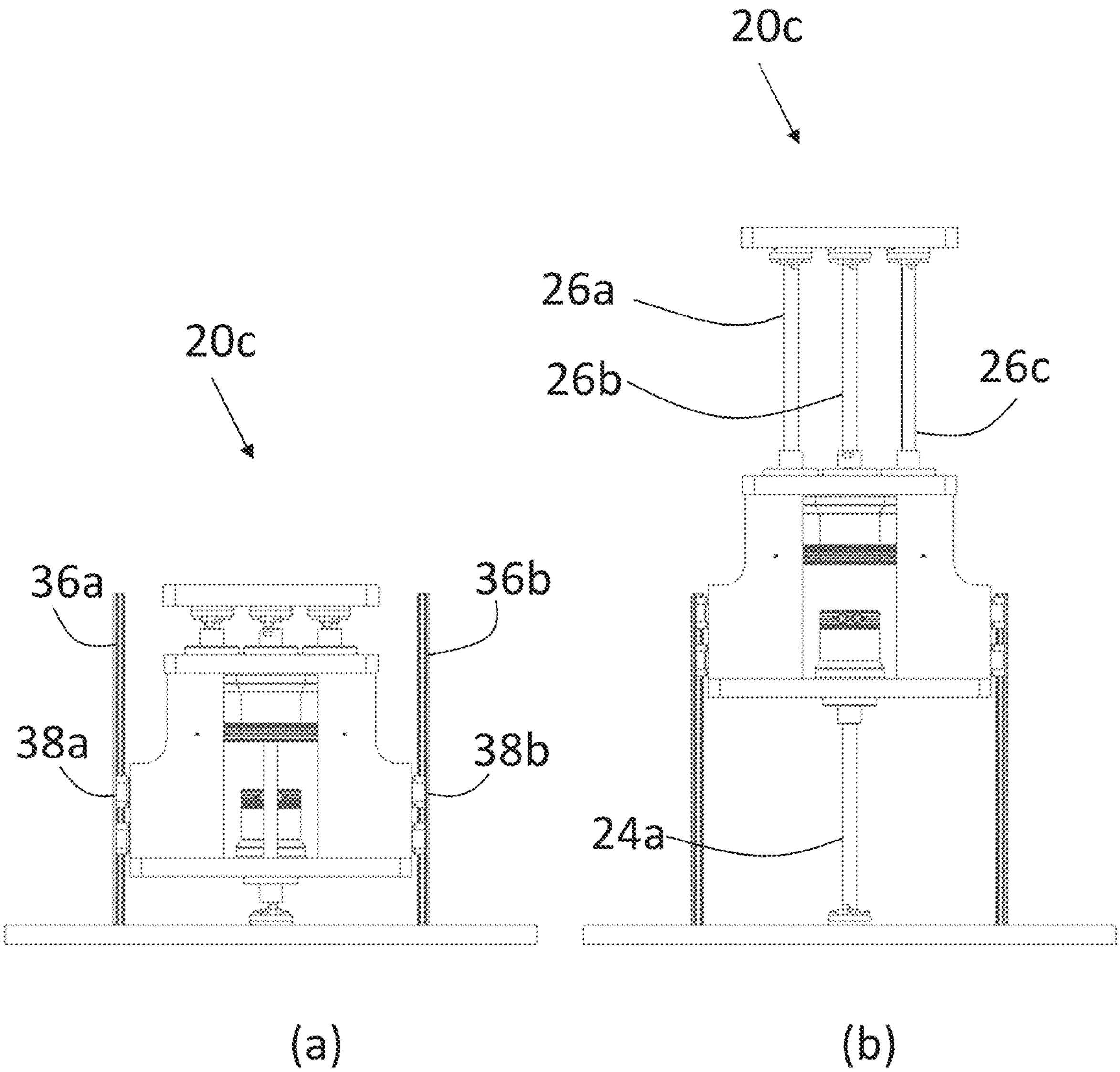

The invention is explained below with reference to the attached figures. It represents:

FIG. 1: a schematic side view of a system for the additive manufacturing of a three-dimensional workpiece comprising a lifting apparatus according to an embodiment of the present disclosure;

FIG. 2: a perspective view of a lifting apparatus according to a first embodiment of the present disclosure, wherein the lifting apparatus comprises three first spindles and three second spindles, wherein section (a) represents a fully retracted state and section (b) represents a fully extended state of the lifting apparatus;

FIG. 3: a side view of the lifting apparatus according to the first embodiment, where section (a) represents the fully retracted state and section (b) represents the fully extended state;

FIG. 4: a perspective view of the lifting apparatus according to the first embodiment in a partially retracted state of the lifting apparatus;

FIG. 5: a side view of a lifting apparatus according to a second embodiment of the present disclosure, wherein the lifting apparatus comprises two first spindles and three second spindles, and wherein section (a) represents a fully retracted state and section (b) represents a fully extended state of the lifting apparatus; and FIG. 6: a side view of a lifting apparatus according to a third embodiment of the present disclosure, wherein the lifting apparatus comprises one first spindle and three second spindles, and wherein section (a) represents a fully retracted state and section (b) represents a fully extended state of the lifting apparatus.

FIG. 1 shows a system 1 for the additive manufacturing of a three-dimensional workpiece 2, wherein the system 1 comprises a lifting apparatus 20 for a carrier device 5 of the system 1. Apart from the lifting apparatus 20, the system 1 is a conventional system for selective laser melting with the known components. The technology of selective laser melting used by the system 1 is well known to the skilled person and is only briefly explained here with reference to selective laser melting in the powder bed 3.

First, a first layer of raw material powder is applied to a carrier 5 (also: carrier device 5) of the system 1 and irradiated in a site-specific manner by one or more laser beams 7*a*, 7*b* in such a way that desired areas of the powder are solidified. The present example shows a system 1 with two irradiation units, each comprising a laser 9*a*, 9*b* and an optical system 11*a*, 11*b*. Thus, the irradiation unit comprising the laser 9*a* and the optics 11*a* is configured to emit the laser beam 7*a* and to direct it to a desired location of an uppermost powder layer of the powder bed 3. Furthermore, the irradiation unit, which comprises the laser 9*b* and the optics 11*b*, is configured to emit the laser beam 7*b* and direct it to a desired location of the uppermost powder layer of the powder bed 3. The optics 11*a*, 11*b* each comprise components for beam shaping and beam deflection, such as lenses, deflecting mirrors, scanner mirrors, etc.

All components of the system 1 are controlled by a control unit 13, in particular the lasers 9*a*, 9*b*, the scanner mirrors of the optics 11*a*, 11*b*, the movement of the carrier 5 with the aid of the lifting apparatus 20 and the function of the powder application device 15 described below.

After the first layer of powder has been solidified as desired, another layer of powder is applied onto the previous powder layer and this top layer is irradiated and solidified again.

In order to always maintain a distance between the uppermost layer and the optical units constant, it is possible to lower the carrier 5 and/or to raise the optical units (along a vertical direction defined here as the z-direction) during the building process. In this way, the three-dimensional workpiece 2 to be produced is built up layer by layer. The unsolidified powder can then be removed and optionally be reused.

The horizontally movable powder application device 15, which has suitable means for applying powder in layers (for example, at least one roller and/or at least one squeegee and/or at least one pusher and/or at least one storage container, etc.), is used to apply the powder.

A gas supply 17 supplies a build chamber 19 of the system 1 with inert gas, so that an inert gas atmosphere prevails within the build chamber 19. Furthermore, a gas extraction system (not shown) may be provided, which sucks the inert gas back out of the build chamber 19 so that a gas flow through the build chamber (in particular across the powder bed 3) is generated 19.

In the following, the lifting apparatus 20 is explained in detail with reference to several embodiments. In other words, the lifting apparatus according to each of the following embodiments may be used as the lifting apparatus 20 of the system 1 of FIG. 1.

FIG. 2 shows a perspective view of a lifting apparatus 20*a* according to a first embodiment of the present disclosure. Section (a) of FIG. 2 shows a fully retracted state of the lifting apparatus 20*a*, and section (b) shows a fully extended state thereof.

In the following, the reference signs 20*a*, 20*b* and 20*c* are used for specific embodiments of the lifting apparatus 20. In other words, any of the embodiments described below may be used as lifting apparatus 20 (for example in FIG. 1). The reference sign 20 thus comprises the "sub-reference signs" 20*a*, 20*b* and 20*c*. The same applies to the other reference signs used herein, which bear the small letters a, b and c respectively. The lifting apparatus 20 is generally configured to move the carrier device 5 of the system vertically (i.e. along the z-direction).

For better clarity, only the representations of the extended state are provided with reference signs in the following figures. It is understood that the corresponding elements of the lifting apparatus 20 in the retracted state bear the same reference signs as the same elements in the extended state.

The lifting apparatus 20*a* comprises a base element in the form of a base plate 22 and three first spindles 24*a*, 24*b*, 24*c* (hereinafter generally referred to as first spindles 24) attached to the base plate 22 by means of screws. When the terms "first", "second", "third", etc. are used herein, this is merely for the purpose of linguistic differentiation of the individual elements. For example, the "first spindles" 24 of the lower level of the lifting apparatus 20 (or also: lower stage) are distinguished linguistically from the "second spindles" 26 of the upper stage.

The plate-shaped base element 22, which is shown in FIG. 2, is not to be understood restrictively and the base element may also be present as a non-plate-shaped element, for example as a frame structure to which the one or more first spindles 24 are attached.

The spindles 24 and 26 are threaded rods and therefore have a thread on their lateral surface. The spindles 24 are firmly connected to the base plate 22 insofar as they are not rotatably mounted. The spindles 24 each extend perpendicular to the base plate 22 in the z-direction.

The lifting apparatus 20*a* further comprises a lifting platform 28 with three second spindles 26*a*, 26*b*, 26*c* (hereinafter generally referred to as second spindles 26) attached thereto. In the embodiment shown, the lifting platform 28 comprises a plate-shaped element. The second spindles 26 each extend downwardly from the lifting platform 28 perpendicularly thereto, along the z-direction. An intermediate level in the form of an intermediate frame 30 is provided between the base plate 22 and the lifting platform 28. In the illustrated embodiment, the intermediate frame 30 comprises two horizontally extending plate elements and connecting elements located therebetween. Ultimately, the specific design of the intermediate frame 30 is at the discretion of the person skilled in the art and a wide variety of possible designs are conceivable.

The intermediate frame 30 comprises three first driving devices 32*a*, 32*b*, 32*c*, which are associated with the respective first spindles 24*a*, 24*b*, 24*c*. More precisely, the driving device 32*a* interacts with the spindle 24*a* and/or constitutes a drive for this spindle. The same applies to the driving devices 32*b* and 32*c* and the associated spindles 24*b* and 24*c*. The intermediate frame 30 further comprises three second driving devices 34*a* (concealed in the figure and therefore not shown), 34*b*, 34*c*, which are associated with the respective second spindles 26*a*, 26*b*, 26*c*. More precisely, the driving device 34*a* interacts with the spindle 26*a* and/or constitutes a drive for this spindle. The same applies to the driving devices 34*b* and 34*c* and the associated spindles 26*b* and 26*c*.

The first driving devices 32 (collectively for: 32*a*, 32*b*, 32*c*) as well as the second driving devices 34 (collectively for: 34*a*, 34*b*, 34*c*) are each firmly connected to the further elements of the intermediate frame 30. In the embodiment shown, the driving devices 32 and 34 are each attached to a plate of the intermediate frame, the associated spindles 24 and 26 being guided through associated holes in the respective plate of the intermediate frame 30.

The driving devices 32 and 34 each comprise a ball screw with a shaft drive. More precisely, the driving devices 32 and

34 are used to rotate a ball screw around the (fixed) spindle 24 and 26 respectively, which leads to a relative movement of the spindle and the driving device due to the thread of the spindle.

In this way, driving the driving devices 32 causes vertical movement of the intermediate frame 30 relative to the first spindles 24 and the base plate 22. Further, driving the second driving devices 34 causes vertical movement of the second spindles 26 and the lifting platform 28. In this way, both movement of the first driving devices 32 and movement of the second driving devices 34 causes movement of the lifting platform 28 relative to the base plate 22. In other words, both movement of the first driving devices 32 and movement of the second driving devices 34 can cause vertical raising or lowering of the lifting platform 28.

In one embodiment, the carrier device 5 is attached directly to the lifting platform 28, for example screwed to it. Alternatively, the lifting platform 28 may represent the carrier device 5.

In other embodiments (not shown), the lifting apparatus is more than two-stage and further (third) driving devices are provided on the lifting platform 28, which thus represents a further intermediate frame. The third driving devices in turn drive associated third spindles, which are firmly connected at their upper end to a further lifting platform. For example, the carrier device 5 may be attached to this lifting platform, which in this specific embodiment represents a three-stage lifting apparatus.

In one embodiment, the first driving devices 32 are controllable independently of the second driving devices 34. For example, a separate motor (in particular servomotor) or actuator may be provided in each of the driving devices 32, 34, which can be controlled individually by a control unit (for example by the control unit 13). Thus, if only the first driving devices 32 are operated, but not the second driving devices 34, only the "lower stage" (or "first stage") of the lifting apparatus 20*a* moves. If only the second driving devices 34 are operated, but not the first driving devices 32, then only the "upper stage" (or "second stage") of the lifting apparatus 20*a* moves. If both the first and the second driving device are moved simultaneously, both stages move simultaneously and the lifting platform 28 can thus be moved (i.e. raised or lowered) faster relative to the base plate 22.

In a further embodiment, the first and/or second driving devices 32, 34 are individually controllable with respect to each other. Thus, each of the individual driving devices 32*a*, 32*b*, 32*c* and/or each of the individual driving devices 34*a*, 34*b*, 34*c* can be individually controlled. In this way, for example, a (for example non-horizontal) orientation of the lifting platform 28 can be changed and, in particular, can be adjusted so that the lifting platform 28 is oriented horizontally (in particular horizontally with respect to the ground horizon or parallel to the base plate 22). In other words, the lifting platform 28 can be leveled.

As three driving devices 24, 26 are provided for each of the lower stage and the upper stage, both the intermediate frame 30 and the lifting platform 28 can be inclined with respect to two non-parallel axes. It is thus possible to completely level the intermediate frame 30 and the lifting platform 28. Leveling the lifting platform 28 means that the carrier device 5 connected to it is also leveled, which may be necessary in the additive manufacturing process, for example, in order to avoid any loss of quality.

For the purpose of orienting the lifting platform 28 and the associated orienting of the carrier device 5, the lifting apparatus 20 may comprise a device for detecting an orientation of the lifting platform 28. This may, for example, be a sensor arrangement which is provided in the lifting platform 28 or the carrier device 5. The sensor arrangement may comprise, for example, a triangulation laser system or an electronic spirit level, in particular one or more MEMS, which are suitable for detecting the earth's gravitational force. Further, the device for detecting the orientation of the lifting platform 28 may comprise a linear encoder. Linear encoders may, for example, be provided in connection with the guide rails described below and, in particular, can detect a position of a rail guide in relation to the respective guide rail.

The lifting apparatus 20*a* further comprises two guide rails 36*a* and 36*b*. The guide rails 36*a*, 36*b* are fixedly connected to the base plate 22 and extend perpendicularly thereto, parallel to the spindles 24 and 26. The guide rails 36*a*, 36*b* guide associated rail guides 38*a* and 38*b*, which are fixedly connected to the intermediate frame 30.

In this way, the intermediate frame 30 is guided during its vertical movement along the guide rails 36*a*, 36*b* and twisting of the intermediate frame 30 is prevented. In the first embodiment shown, two rail guides are provided one above the other for each guide rail 36, which results in better stability of the guided element (the intermediate frame 30), in particular against tilting. The rail guides 38 may each be provided in the form of a carriage. However, the number of rail guides 38 per guide rail can be increased and decreased as desired, wherein a larger number of rail guides 38 can contribute to increased stability of the intermediate frame 30.

Section (a) of FIG. 2 represents a fully retracted state of the lifting apparatus 20*a*, in which both the first stage and the second stage are retracted and the lifting platform 28 is thus at the lowest possible height. Section (b) of FIG. 2 represents a fully extended state of the lifting apparatus 20*a*, in which both the first stage and the second stage are extended and the lifting platform 28 is thus at the greatest possible height.

FIG. 3 shows the lifting apparatus 20*a* according to the first embodiment of FIG. 2 in a side view (viewing direction along the y-axis of FIG. 2). The elements shown correspond to those of FIGS. 2(*a*) and 2(*b*).

FIG. 4 shows the lifting apparatus 20*a* according to the first embodiment of FIG. 2 in a perspective view, similar to the view of FIG. 2. In the illustration of FIG. 4, a partially retracted or partially extended state of the lifting apparatus 20*a* is shown. Here, the lower (first) stage is extended and the upper (second) stage is retracted. The first driving devices 32 are thus controllable independently of the second driving devices 34, so that any desired states of the lifting apparatus 20*a* can be assumed with respect to a position of the intermediate frame 30 in relation to the base plate 22 and a position of the lifting platform 28 in relation to the intermediate frame 30.

FIG. 5 shows a side view of a lifting apparatus 20*b* according to a second embodiment of the present disclosure, wherein the lifting apparatus comprises two first spindles 24*a*, 24*b* and three second spindles 26*a*, 26*b*, 26*c*. Associated with each of these spindles 24 and 26, the lifting apparatus 20*c* has two first driving units 32*a*, 32*b* and three second driving units 34*a*, 34*b*, 23*c*. Section (a) shows a fully retracted state of the lifting apparatus 20*b* and section (b) shows a fully extended state of the lifting apparatus 20*b*.

In the second embodiment example of FIG. 5, only some elements are provided with reference signs, whereby the elements which clearly correspond to those of the first embodiment example are to be regarded as being provided with the same reference signs.

Apart from the number of first spindles 24 and first driving devices 32, the lifting apparatus 20*b* of the second embodiment example is identical to the lifting apparatus 20*a* of the first embodiment example. The above description of the first embodiment example applies accordingly to the second embodiment example.

An advantage of the second embodiment example over the first embodiment example may be that a first spindle 24*c* and a first driving device 32*c* can be dispensed with. Sufficient guidance and stabilization of the intermediate frame 30 during movement of the lower stage is ensured by the guide rails 36 and the associated rail guides 38. A sufficient possibility of changing the alignment of the lifting platform 28 (leveling) is ensured by the provision of three second spindles 26.

An advantage of the first embodiment example over the second embodiment example may be that larger loads can be lifted (since the total load is distributed over three first spindles 24). Furthermore, the intermediate frame 30 can already be aligned using the three first spindles 24, which creates greater flexibility in the alignment. In particular in connection with the first embodiment example, for example, the guide rails 36 and the associated rail guides 38 can also be omitted. This applies in principle to all embodiments mentioned herein.

FIG. 6 shows a side view of a lifting apparatus 20*c* according to a second embodiment of the present disclosure, wherein the lifting apparatus comprises a first spindle 24*a* and three second spindles 26*a*, 26*b*, 26*c*. Associated with each of these spindles 24 and 26, the lifting apparatus 20*c* comprises a first driving unit 32*a* and three second driving units 34*a*, 34*b*, 34*c*. Section (a) shows a fully retracted state of the lifting apparatus 20*c* and section (b) shows a fully extended state of the lifting apparatus 20*c*.

In the third embodiment of FIG. 6, only some elements are provided with reference signs, wherein the elements which clearly correspond to those of the first embodiment example are to be regarded as being provided with the same reference signs.

Apart from the number and arrangement position of the first spindles 24 and the first driving devices 32, the lifting apparatus 20*c* of the third embodiment is identical to the lifting apparatus 20*a* of the first embodiment and the lifting apparatus 20*b* of the second embodiment. The above description of the first embodiment applies accordingly to the third embodiment.

An advantage of the third embodiment over the first and second embodiment may be that the number of first spindles 24 can be reduced to one, which saves costs and material. Sufficient guidance and stabilization of the intermediate frame 30 during movement of the lower stage is ensured by the guide rails 36 and the associated rail guides 38. A sufficient possibility of changing the orientation of the lifting platform 28 is ensured by the provision of three second spindles 26.

It should be pointed out that the number of first spindles 24 and the number of second spindles 26 is ultimately arbitrary in each case and embodiments are thus conceivable, for example, which have the following number of first spindles/second spindles: 1/1, 1/2, 1/3, 1/4, 2/1, 2/2, 2/3, 2/4, 3/1, 3/2, 3/3, 3/4, 4/1, 4/2, 4/3, 4/4, etc. Of these, the constellations 3/3, 2/3 and 1/3 can be particularly advantageous, as described above.

Furthermore, multi-stage lifting apparatus are possible, which have more than two stages, wherein at least one spindle with associated driving device is provided for each stage. For example, two-stage, three-stage, four-stage, five-stage, etc. lifting apparatus are conceivable.

With the technology described above, a lifting apparatus can be provided which is compact when retracted and allows a large distance between base plate 22 and lifting platform 28 when fully extended. In this way, large (in particular high) workpieces can also be produced in low production halls, since the overall height of the system 1 remains relatively low. Furthermore, the presented technology can enable precise and stable positioning, in particular with regard to deformations of the lifting apparatus 20. Furthermore, safe and stable guidance can be ensured. Furthermore, it may be possible to enable alignment and, in particular, leveling of the lifting platform 28.

A 2-stage lifting column "Multistage" as described in the above embodiments (a 3-stage or multi-stage lifting column is also conceivable) can be used for positionally precise electrical height adjustment under heavy loads (e.g. 500-5000 kg), in particular for a build job and safe, stable guidance over the entire stroke with small external dimensions. The shaft drives (servo drives) with rotating ball screw, arranged antiparallel next to each other in two actuating directions, can accommodate a higher load by dividing the total stroke into two small individual strokes than without this division.

Depending on the number of drives and the number of roller rail guides, different positioning accuracies result. This can be particularly relevant in the additive sector with large build jobs.

The invention claimed is:

1. Lifting apparatus for a carrier device of a system for the additive manufacturing of a three-dimensional workpiece, comprising:

a base element;

at least one first spindle attached to the base element;

a lifting platform;

at least one second spindle attached to the lifting platform; and at least one intermediate frame comprising at least one first driving device for vertically moving the intermediate frame relative to the first spindle and the base element and at least one second driving device for vertically moving the second spindle and the lifting platform relative to the intermediate frame.

2. Lifting apparatus according to claim 1, wherein the lifting platform comprises the carrier device of the system.

3. Lifting apparatus according to claim 1, wherein the lifting platform comprises a further intermediate frame, and wherein the lifting apparatus further comprises:

a further lifting platform; and at least one third spindle attached to the further lifting platform, wherein the further intermediate frame comprises at least one third driving device for vertically moving the third spindle and the further lifting platform relative to the further intermediate frame.

4. Lifting apparatus according to claim 1, wherein the first driving device and the second driving device are controllable independently of one another.

5. Lifting apparatus according to claim 4, wherein the first driving device comprises a first motor and the second driving device comprises a second motor.

6. Lifting apparatus according to claim 1, further comprising:

at least one further first spindle attached to the base element, wherein the intermediate frame comprises at least one further first driving device for vertically moving the intermediate frame relative to the further first spindle and the base element.

7. Lifting apparatus according to claim 6, wherein the first driving device and the further first driving device are controllable independently of one another.

8. Lifting apparatus according to claim 1, further comprising:

a control unit for independently controlling the first driving device and the second driving device.

9. Lifting apparatus according to claim 1, further comprising:

at least one further second spindle attached to the lifting platform, wherein the intermediate frame comprises at least one further second driving device for vertically moving the further second spindle and the lifting platform relative to the intermediate frame.

10. Lifting apparatus according to claim 9, wherein the second driving device and the further second driving device are controllable independently of one another.

11. Lifting apparatus according to claim 10, further comprising:

a control unit for independently controlling the first driving device and the second driving device;

at least three second spindles attached to the lifting platform, wherein the intermediate frame comprises at least three second driving devices for vertically moving the three second spindles and the lifting platform relative to the intermediate frame; and a device for detecting an orientation of the lifting platform, wherein the control unit is configured to control the second driving devices based on detection data of the device for detecting the orientation of the lifting platform so that the lifting platform is horizontally oriented.

12. Lifting apparatus according to claim 11, wherein the device for detecting an orientation of the lifting platform comprises at least one linear encoder.

13. Lifting apparatus according to claim 1, further comprising:

at least one guide rail attached to the base element; and at least one rail guide attached to the intermediate frame for guiding the intermediate frame during its vertical movement relative to the first spindle and the base element.

14. Lifting apparatus according to claim 1, wherein the base element comprises a base plate.

15. A system for the additive manufacturing of a three-dimensional workpiece, comprising the lifting apparatus according to claim 1.

* * * * *